United States Patent
Liu et al.

(10) Patent No.: US 9,236,796 B2
(45) Date of Patent: Jan. 12, 2016

(54) CHARGE PUMP AND METHOD OF HAVING NEGATIVE OUTPUT VOLTAGE TRACKING POSITIVE OUTPUT VOLTAGE THEREOF

(71) Applicant: Chengdu Monolithic Power Systems, Co., Ltd., Chengdu (CN)

(72) Inventors: Bairen Liu, Hangzhou (CN); Hongqiang Qin, Hangzhou (CN); Eric Yang, Saratoga, CA (US); Song Qu, San Jose, CA (US); Paul Ueunten, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/290,715

(22) Filed: May 29, 2014

(65) Prior Publication Data
US 2014/0354349 A1    Dec. 4, 2014

(30) Foreign Application Priority Data
May 29, 2013  (CN) .......................... 2013 1 0205231

(51) Int. Cl.
G05F 1/10      (2006.01)
H02M 3/07      (2006.01)
H02M 3/158     (2006.01)

(52) U.S. Cl.
CPC .............. *H02M 3/07* (2013.01); *H02M 3/1588* (2013.01); *H02M 2003/071* (2013.01)

(58) Field of Classification Search
CPC .......................... H02M 3/07; H02M 2003/071
See application file for complete search history.

(56) References Cited

U.S. PATENT DOCUMENTS

| | | | |
|---|---|---|---|
| 5,532,916 A * | 7/1996 | Tamagawa | 363/62 |
| 5,606,491 A * | 2/1997 | Ellis | 363/60 |
| 5,929,615 A * | 7/1999 | D'Angelo et al. | 323/224 |
| 7,084,611 B2 * | 8/2006 | Kirchner et al. | 323/222 |
| 7,560,910 B2 * | 7/2009 | Hata et al. | 323/222 |
| 7,723,965 B2 * | 5/2010 | Lesso et al. | 323/225 |
| 8,049,551 B2 | 11/2011 | Kotowski | |
| 8,743,567 B2 * | 6/2014 | Singnurkar | 363/24 |
| 8,823,342 B2 * | 9/2014 | Williams | 323/268 |
| 2006/0125552 A1 * | 6/2006 | Wu et al. | 327/536 |
| 2013/0020960 A1 | 1/2013 | Ren | |

* cited by examiner

*Primary Examiner* — Jeffrey Zweizig
(74) *Attorney, Agent, or Firm* — Perkins Coie LLP (57) ABSTRACT

A method having a negative output voltage at a negative output terminal of a charge pump tracking a positive output voltage at a positive output terminal of the charge pump. The charge pump comprises a plurality of switches and each of the plurality of switches has a serially coupled resistance. The method comprises selecting the serially coupled resistance for at least one of the plurality of switches to be different to each of the other respective serially coupled resistances associated to the other switches.

19 Claims, 8 Drawing Sheets

CHARGE PUMP AND METHOD OF HAVING NEGATIVE OUTPUT VOLTAGE TRACKING POSITIVE OUTPUT VOLTAGE THEREOF

CROSS-REFERENCE TO RELATED APPLICATION

This application claims the benefit of CN Patent Application No. 201310205231.1, filed on May 29, 2013, and incorporated herein by reference.

TECHNICAL FIELD

The present invention generally relates to power supply, and more particularly but not exclusively relates to boost charge pump and method of having negative output voltage tracking positive output voltage.

BACKGROUND

One type of charge pump receives an input voltage and provides at the output terminals a positive output voltage which is higher than a reference ground voltage and a negative output voltage which is lower than the reference ground voltage. In many applications, it is required that the negative output voltage tracks the positive output voltage well, that is, the absolute value of the negative output voltage equals or substantially equals the positive output voltage. And it is further appreciated that the negative output voltage tracks the positive output voltage well even at startup.

SUMMARY

In one embodiment, a method has a negative output voltage at a negative output terminal of a charge pump tracking a positive output voltage at a positive output terminal of the charge pump, wherein the charge pump comprises a plurality of switches and each of the plurality of switches has a serially coupled resistance, the method comprising selecting the serially coupled resistance for at least one of the plurality of switches to be different to each of the other respective serially coupled resistances associated to the other switches.

In another embodiment, a charge pump has an input terminal configured to receive an input voltage, a positive output terminal configured to provide a positive output voltage and a negative output terminal configured to provide a negative output voltage, the charge pump comprising a plurality of switches, wherein each of the plurality of switches has a serially coupled resistance, and wherein the serially coupled resistance for one of the plurality of switches is at least twice higher than each serially coupled resistance for the other switches such that the negative output voltage tracks the positive output voltage.

In yet another embodiment, a boost charge pump has an input terminal coupled to an input voltage, a positive output terminal configured to provide a positive output voltage and a negative output terminal configured to provide a negative output voltage, the boost charge pump comprises: an inductor, having a first end and a second end, wherein the first end is coupled to the input terminal; a first switch, having a first end, a second end and a control end, wherein the first end is coupled to the second end of the inductor, and the second end is coupled to a reference ground; a second switch, having a first end, a second end and a control end, wherein the first end is coupled to the second end of the inductor, and the second end is coupled to the positive output terminal; a first output capacitor, having a first end and a second end, wherein the first end is coupled to the second end of the second switch, and the second end of the first output capacitor is coupled to the reference ground; a flying capacitor, having a first end and a second end, wherein the first end is coupled to the second end of the inductor; a third switch, having a first end, a second end and a control end, wherein the first end is coupled to the second end of the flying capacitor and the second end is coupled to the negative output terminal; a second output capacitor, having a first end and a second end, wherein the first end is coupled to the second end of the third switch, and the second end of the second output capacitor is coupled to the reference ground; a fourth switch, having a first end, a second end and a control end, wherein the first end is coupled to the second end of the flying capacitor and the second end of the fourth switch is coupled to the reference ground; and a discrete resistor, coupled in series with the second switch such that the negative output voltage tracks the positive output voltage; wherein during a first time period of a cycle, turning ON the second switch and the fourth switch, and turning OFF the first switch and the third switch; and during a second time period of the cycle, turning OFF the second switch and the fourth switch, and turning ON the first switch and the third switch.

These and other features of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Several embodiments of the present invention are described below with reference to charge pump and method of having a negative output voltage of the charge pump tracking a positive output voltage. As used hereinafter, the term "couple" generally refers to multiple ways including a direct connection with an electrical conductor and an indirect connection through intermediate diodes, resistors, capacitors, and/or other intermediaries.

Figure 1:
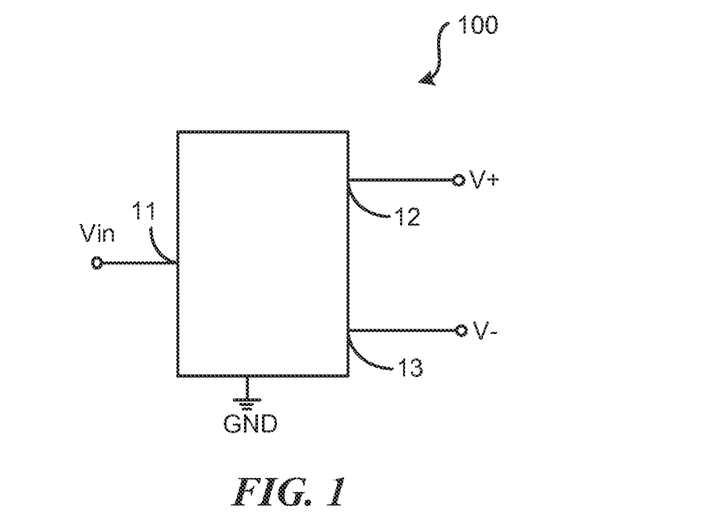
FIG. 1 shows a schematic diagram of a charge pump 100 according to an embodiment of the present invention.

FIG. 1 shows a schematic diagram of a charge pump 100 according to an embodiment of the present invention. Charge pump 100 have an input terminal 11, a positive output terminal 12 and a negative output terminal 13, wherein the input terminal 11 is coupled to an input voltage Vin. The charge pump 100 converts the input voltage Vin into a positive output voltage V+ provided at the positive output terminal 12 and a negative output voltage V− provided at the negative output terminal 13. In one embodiment, the positive output voltage V+ is higher than the input voltage Vin.

The charge pump 100 comprises a plurality of switches. The plurality of switches can be coupled in any possible topology. Each switch has a serially coupled resistance. The resistance may be in many types. In one embodiment, the resistance is from coupling a discrete resistor to the corresponding switch. In another embodiment, the plurality of switches comprise a plurality of semiconductor transistors and the serially coupled resistance for the corresponding switch comprises a parasitic resistance. In yet another embodiment, the resistance is from an integrated resistor that is fabricated in one semiconductor substrate with the corresponding switch and the resistor can be in any possible form, such as one doped region, several doped regions etc. The resistances for the plurality of switches may be in one type e.g. all are parasitic resistances or all are from discrete resistors. The resistances for the plurality of switches may be in many types e.g. one is parasitic resistance and another is from a discrete resistor.

It is desired that the absolute value of the negative output voltage V− equals or substantially equals the positive output voltage V+, or in other words, the negative output voltage V− tracks positive output voltage V+. One method of having the negative output voltage V− tracking the positive output voltage V+ comprises selecting asymmetric serially coupled resistances for the plurality of switches. That is, the serially coupled resistances for the plurality of switches are selected to be not the same value, and the serially coupled resistance for at least one of the plurality of switches is different to each of the other respective serially coupled resistances associated to the other switches. In one embodiment, the resistance serially coupled to one switch is at least twice higher than those for the other switches. In one embodiment, the highest resistance that is serially coupled to one switch of the charge pump is 10 times higher than the lowest resistance that is serially coupled to another switch of the charge pump. In one embodiment, the serially coupled resistances are on-resistances of the switches. And in another embodiment, selecting asymmetric serially coupled resistances for the plurality of switches comprises coupling a discrete resistor in series with one of the plurality of switches.

Figure 2:
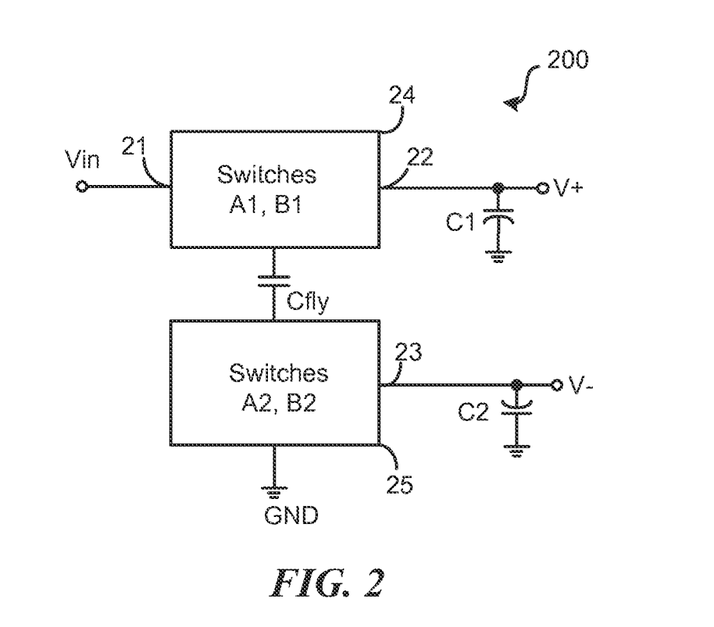
FIG. 2 shows a schematic diagram of a charge pump 200 comprising a first output capacitor C1, a second output capacitor C2 and a flying capacitor Cfly according to an embodiment of the present invention.

FIG. 2 shows a schematic diagram of a charge pump 200 according to an embodiment of the present invention. Charge pump 200 comprises a first module 24 coupled to the positive output terminal 22 and a second module 25 coupled to the negative output terminal 23. The first module 24 comprises a first switch A1 and a second switch B1. The second module 25 comprises a third switch A2 and a fourth switch B2. Charge pump 200 further comprises a plurality of capacitors comprising a first output capacitor C1, a second output capacitor C2 and a flying capacitor Cfly. The first output capacitor C1 is coupled between the positive output terminal 22 and the reference ground GND, and provides the positive output voltage V+. The second output capacitor C2 is coupled between the negative output terminal 23 and the reference ground GND, and provides the negative output voltage V−. The flying capacitor Cfly is coupled between the first module 24 and the second module 25. A plurality of switches comprises a first group of switches A1 and A2, and a second group of switches B1 and B2. The first group of switches A1 and A2 and the second group of switches B1 and B2 are switched on and off in complementary pattern. At a first time period of a cycle when a driving signal is at a first state, the first group of switches A1 and A2 are turned off and the second group of switches B1 and B2 are turned on, current flows from the positive output terminal 22 to the reference ground GND, and the first output capacitor C1 is charged; and at a second time period of the cycle when the driving signal is at a second state that is in different logic level from the first state, the first group of switches A1 and A2 are turned on and the second group of switches B1 and B2 are turned off, current flows from the reference ground GND to the negative output terminal 23, and the second output capacitor C2 is discharged. In one embodiment, at startup, the method of having the negative output voltage V− tracking the positive output voltage V+ further comprises starting charging the first output capacitor C1 and the flying capacitor Cfly at the same time, such that the positive output voltage V+ and the negative output voltage V− rises at the same time. In one embodiment, startup is defined that during when the input voltage Vin increases from zero to above a threshold voltage. In one embodiment, the charge pump 200 comprises a boost charge pump.

Figure 3:
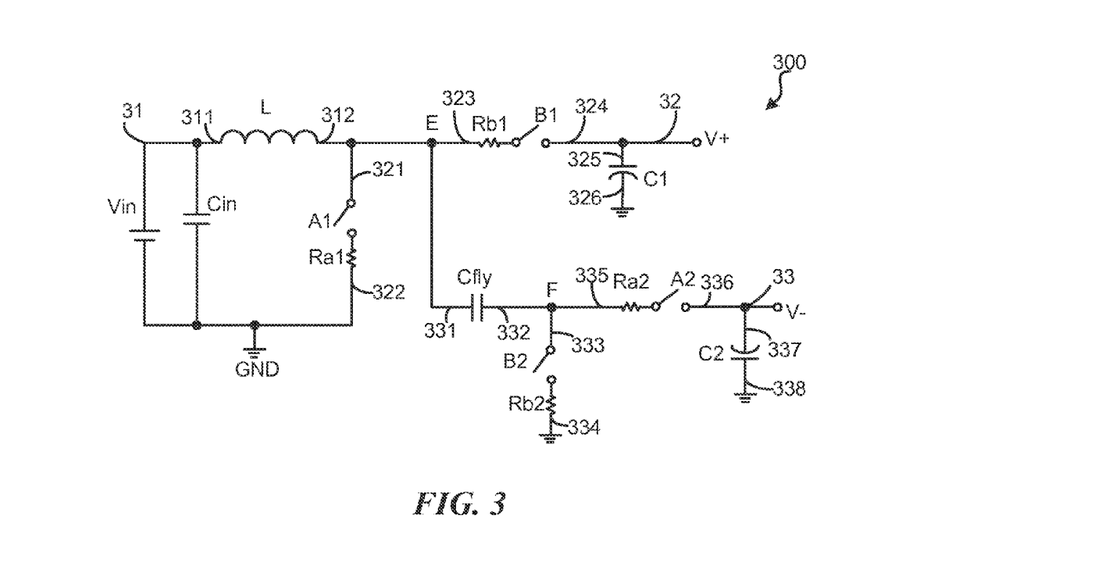
FIG. 3 shows a circuit diagram of a boost charge pump 300 according to an embodiment of the present invention.

FIG. 3 shows a circuit diagram of a boost charge pump 300 according to an embodiment of the present invention. Boost charge pump 300 comprises an inductor L, a first switch A1, a second switch B1, a first output capacitor C1, a flying capacitor Cfly, a third switch A2, a second output capacitor C2 and a fourth switch B2. Inductor L has a first end 311 and a second end 312, wherein the first end 311 is coupled to an input terminal 31. The first switch A1 has a first end 321, a second end 322 and a control end, wherein the first end 321 is coupled to the second end 312 of the inductor L, and the second end 322 is coupled to a reference ground GND. The second switch B1 has a first end 323, a second end 324 and a control end, wherein the first end 323 is coupled to the second end 312 of the inductor L, and the second end 324 of the second switch B1 is coupled to the positive output terminal 32. The first output capacitor C1 has a first end 325 and a second end 326, wherein the first end 325 is coupled to the second end 324 of the second switch B1, and the second end 326 of the first output capacitor C1 is coupled to the reference ground GND. The flying capacitor Cfly has a first end 331 and a second end 332, wherein the first end 331 is coupled to the second end 312 of the inductor L. The third switch A2 has a first end 335, a second end 336 and a control end, wherein the first end 335 is coupled to the second end 332 of the flying capacitor Cfly, and the second end 336 is coupled to the negative output terminal 33. The second output capacitor C2 has a first end 337 and a second end 338, wherein the first end 337 is coupled to the second end 336 of the third switch A2, and the second end 338 of the second output capacitor C2 is coupled to the reference ground GND. The fourth switch B2 has a first end 333, a second end 334 and a control end, wherein the first end 333 is coupled to the second end 332 of the flying capacitor Cfly and the second end 334 of the fourth switch B2 is coupled to the reference ground GND. Each of the switches A1, B1, A2 and B2 is coupled in series with a corresponding resistor named resistor Ra1, Rb1, Ra2 and Rb2 respectively. At a first period of a cycle, the second switch B1 and the fourth switch B2 are turned on, the first switch A1 and the third switch A2 are turned off, the first output capacitor C1 is charged, and the positive output voltage V+ rises. And at a second period of the cycle, the first switch A1 and the third switch A2 are turned on, the second switch B1 and the fourth switch B2 are turned off, the second output capacitor C2 is discharged, and the absolute value of the negative output voltage V− rises. As can be appreciated, the charge pump may have different topology than the charge pump shown in FIG. 3, for example, each switch may be replaced by a plurality of switches coupled in parallel, or each capacitor may be replaced by a capacitor network.

FIGS. 4A-4D show a boost charge pump 400, its related driving signals (S1 and S2) and the working states to illustrate a method of having a negative output voltage V− tracking a positive output voltage V+, according to an embodiment of the present invention. The topology of boost charge pump 400 is similar to the charge pump 300 in FIG. 3. For ease of illustration, the connection relationship of charge pump 400 will not be described in detail. In the boost charge pump 400, the control end of the first switch A1 and the control end of the third switch A2 are coupled to a first driving signal S1. The control end of the second switch B1 and the control end of the fourth switch B2 are coupled to a second driving signal S2.

Figure 4A:
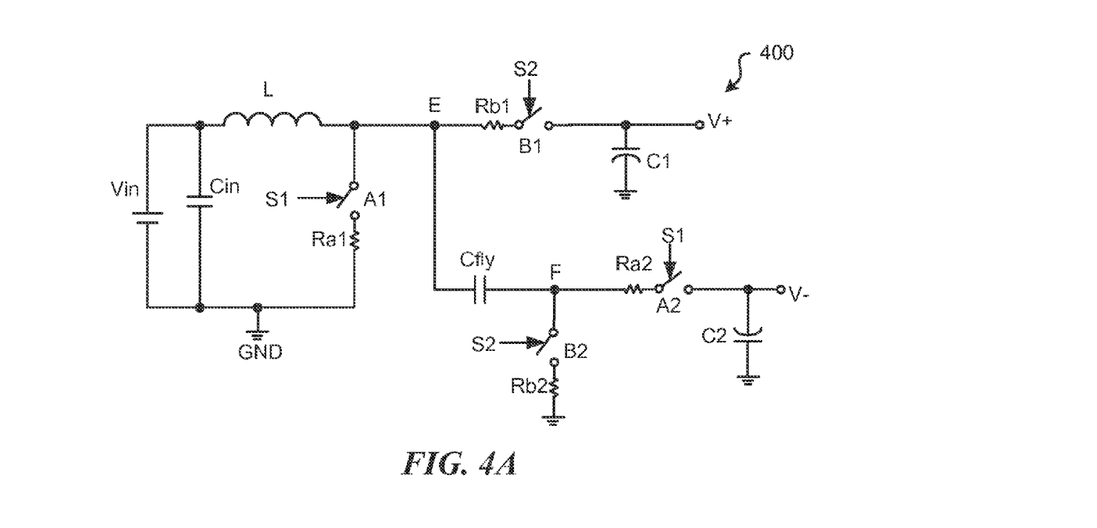
FIGS. 4A-4D show a circuit diagram of a charge pump 400, its related driving signals and its two working states to illustrate a method of having a negative output voltage tracking a positive output voltage according to an embodiment of the present invention.
Figure 4B:
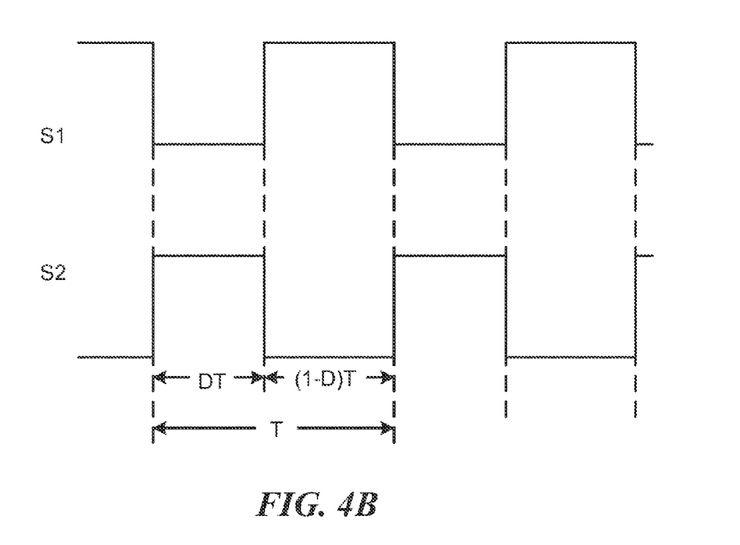
Figure 4C:
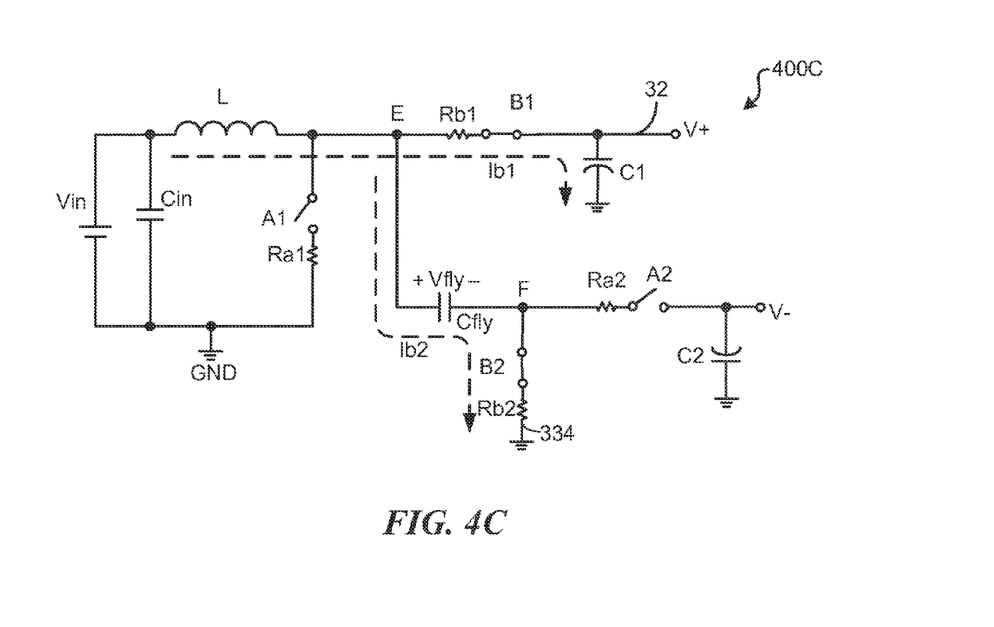

The second driving signal 52 is in a complementary pattern with the first driving signal S1, with reference to FIG. 4B. During a first period DT of a cycle T, the first driving signal S1 is in a first state for example logic LOW and the second driving signal S2 is in a second state for example logic HIGH. Accordingly, the second group of switches including the second switch B1 and the fourth switch B2 are turned on, referring to schematic view 4000 shown in FIG. 4O, and the first group of switches including first switch A1 and the third switch A2 are turned off. At this period, current Ib1 flows through the second switch B1 from inductor L to the positive output terminal 32, and the first output capacitor C1 is charged, and the positive output voltage V+ increases; at the meantime, current Ib2 flows through the flying capacitor Cfly and the fourth switch B2 from inductor L to the ground GND, and the flying capacitor Cfly is charged. During this period, $$Ib1*(1-D)=I_{o+} \quad (1)$$

$$Ib1+Ib2=I_L \quad (2)$$

$$V^{+}+Ib1*Rb1=V_{cfly}+Ib2*Rb2 \quad (3)$$

Wherein D is the duty cycle of the driving signal S2, Io+ is the output current at the positive output terminal, IL is the current flowing through inductor L, and Vcfly is the voltage across flying capacitor Cfly.

Figure 4D:
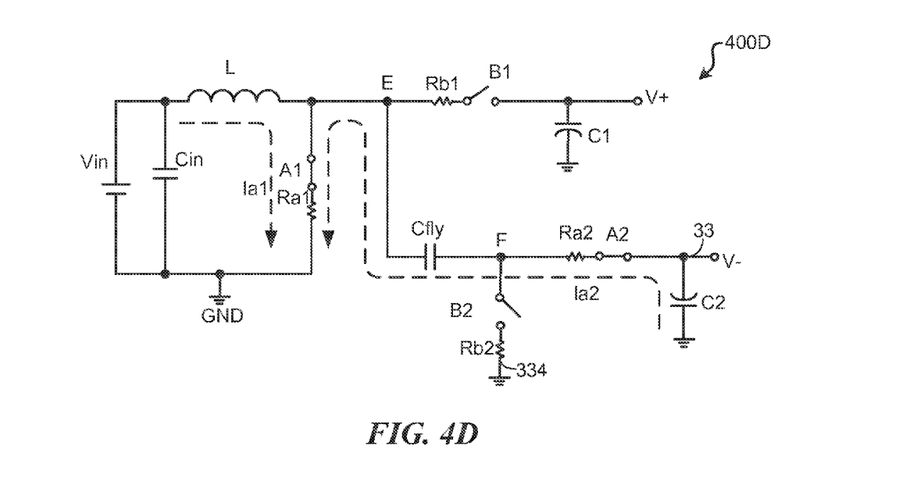

And during the other time period (1-D)T of the cycle T as shown in FIG. 4B, the first driving signal S1 shifts into logic HIGH and the second driving signal S2 shifts into logic LOW, and accordingly the first groups of switches including the first switch A1 and the third switch A2 are turned on and the second group of switches including the second switch B1 and the fourth switch B2 are turned off. During this period, referring to schematic view 400D shown in FIG. 4D, current Ia1 flows through the first switch A1 from inductor L to reference ground GND; and at the meantime current Ia2 flows through the third switch A2 and flying capacitor Cfly from reference ground GND to the first switch A1, and the second output capacitor C2 and flying capacitor Cfly are discharged. During this period, $$Ia2*D=I_{o-} \quad (4)$$

$$Vcfly=V_{-}+Ra2*Ia2+(I_L+Ia2)*Ra1 \quad (5)$$

Where Io− is the output current at the negative output terminal 33, and the label V− in the equations denotes the absolute value of the negative output voltage.

The current following through the flying capacitor Cfly in one cycle is supposed to be balanced and getting that:

$$Ib2*(1-D)=Ia2*D \quad (6)$$

According to the equations (1) to (6), it can have the equation of:

$$V_{-} = V_{+} + \frac{I_{o+}}{1-D}*Rb1 - \frac{I_{o-}}{1-D}Rb2 - \frac{I_{o-}}{D}Ra2 - \left(I_L + \frac{I_{o-}}{D}\right)Ra1 \quad (7)$$

According to the above equation, the absolute value of negative output voltage V− increases when resistance Rb1 increases, and the absolute value of negative output voltage V− increases when the other resistances Ra1, Ra2 and Rb2 decreases. In order to achieve good tracking performance between the negative output voltage V− and the positive output voltage V+, or in other words the negative output voltage V− has a substantially same absolute value with the positive output voltage V+, it is required that:

$$\frac{1_{o+}}{1-D}*Rb1 - \frac{I_{o-}}{1-D}Rb2 - \frac{I_{o-}}{D}Ra2 - \left(I_L + \frac{I_{o-}}{D}\right)Ra1 \approx 0 \quad (8)$$

And this can be achieved by selecting asymmetric resistances for resistors Ra1, Ra2, Rb1 and Rb2 such that the serially coupled resistance Rb1 for switch B1 is selected to be higher than the resistances Ra1, Ra2 and Rb2 for switches A1, A2 and B2. In one embodiment, the resistance Rb1 is 5 times higher than the other resistances Ra1, Ra2 and Rb2. The asymmetric serially coupled resistances for switch B1 and other switches A1, A2 and B2 help to compensate the voltage difference between the absolute value of negative output voltage V− and the positive output voltage V+. In one embodiment, resistance Rb1=3 Ohms, resistance Ra1=0.45 Ohms, and resistances Ra2=Rb2=0.5 Ohms.

Figure 5:
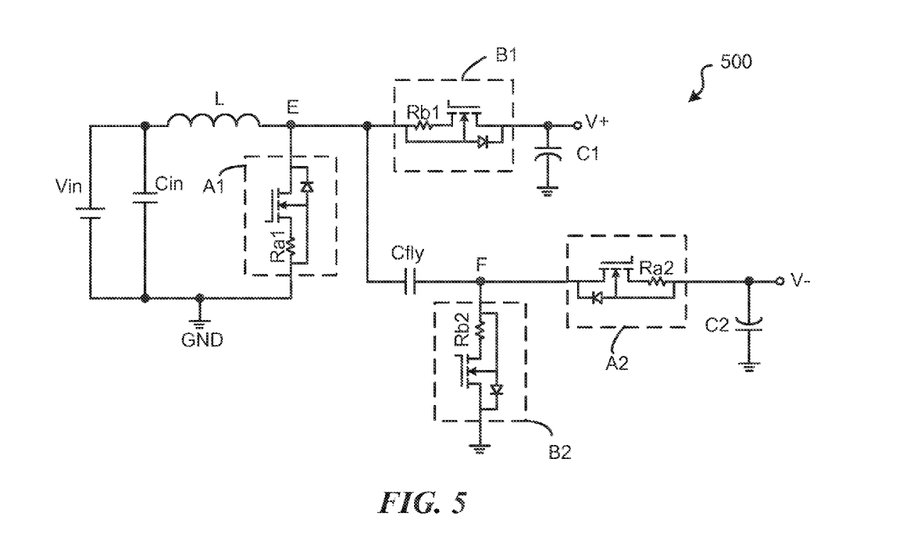
FIG. 5 shows a circuit diagram of a boost charge pump 500 comprising a plurality of transistors according to an embodiment of the present invention.

FIG. 5 shows a circuit diagram of a charge pump 500 comprising a plurality of transistors A1, A2, B1 and B2, according to an embodiment of the present invention. The topology of boost charge pump 500 is similar to the charge pump 300 in FIG. 3. For ease of illustration, the connection relationship of charge pump 500 will not be described in detail. In boost charge pump 500, each of the plurality of switches comprises a corresponding transistor A1, A2, B1 or B2 and the series resistances Ra1, Ra2, Rb1 and Rb2 for the plurality of switches A1, A2, B1 and B2 comprise on-resistances of the semiconductor transistors A1, A2, B1 and B2. Wherein the on-resistances Ra1 Ra2, Rb1 and Rb2 are asymmetric. Each transistor A1, A2, B1 or B2 further comprises a body diode. In one embodiment, the on-resistance Rb1 for the second switch B1 is higher than each of the other on-resistances Ra1, Ra2 and Rb2. This higher on-resistance Rb1 for the second semiconductor transistor B1 may be achieved by a different semiconductor processing method, for example by adjusting the doping concentration or by adjusting the layout for semiconductor transistor B1. In the shown embodiment in FIG. 5, each transistor comprises a metal oxide semiconductor field effect transistor (MOSFET). However, it should be known that other types of transistors, for example junction field effect transistors (JFET) are also applicable without departing from the spirit of the present invention.

Figure 6:
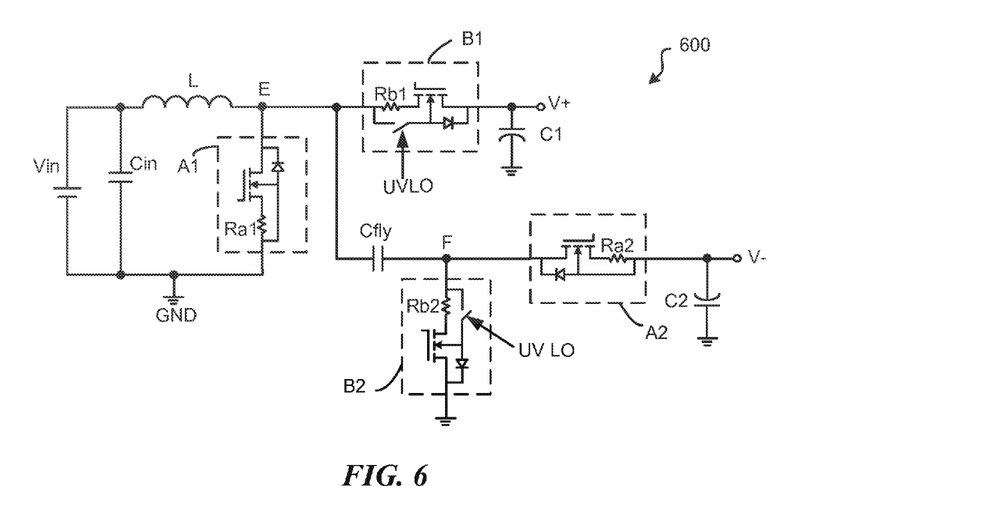
FIG. 6 shows a circuit diagram of a boost charge pump 600 having two switches controlled by an under voltage lock-out (UVLO) signal according to an embodiment of the present invention.

FIG. 6 shows a boost charge pump 600 with two switches B1 and B2 coupled to an UVLO signal to have a good tracking performance between the negative output voltage V− and the positive output voltage V+ at startup, according to an embodiment of the present invention. The topology of boost charge pump 600 is similar to the charge pump 300 in FIG. 3. For ease of illustration, the connection relationship of charge pump 600 will not be described in detail. The plurality of switches A1, A2, B1 and B2 of charge pump 600, each comprises a MOSFET. Each MOSFET A1 A2, B1 and B2 may comprise a plurality of transistor cells fabricated on a semiconductor substrate. Each transistor for example MOSFET A1 comprises a parasitic on-resistance Ra1 and a body diode coupled between the source and drain of transistor A1. An on-resistance is the resistance between the source and drain of a MOSFET when it is turned ON. The UVLO signal is coupled to transistors B1 and B2, configured to block the body diodes of transistors B1 and B2 at startup. UVLO is in active state when the input voltage Vin is below a threshold. When UVLO is in active state, for example logic HIGH, the driving signals are not applied to the control ends of switches A1, B1, A2 and B2, and at the meantime, the body diodes for the second switch B1 and the fourth switch B2 are blocked to make sure no current flows through the switches A1, B1, A2 and B2. Thus no current charges the first output capacitor C1 and the flying capacitor Cfly. When UVLO turns into inactive state, for example, logic LOW while the input voltage Vin reaches the threshold voltage, driving signals are applied to the switches A1, B1, A2 and B2 to make the first group of switches (A1 and A2) and the second group of switches (B1 and B2) switch in alternate pattern. At the meantime, the body diodes of the second switch B1 and the fourth switch B2 are turned ON. Or in other words, the body diodes of the second switch B1 and the fourth switch B2 are blocked when the plurality of switches A1, B1, A2 and B2 are both in OFF state at startup and then released when the switches switch normally. Thus at startup of the boost charge pump 600, the positive output voltage V+ and the negative output voltage V− start to rise from zero at the same time, and the negative output voltage V− tracks the positive output voltage V+ well at startup.

Figure 7:
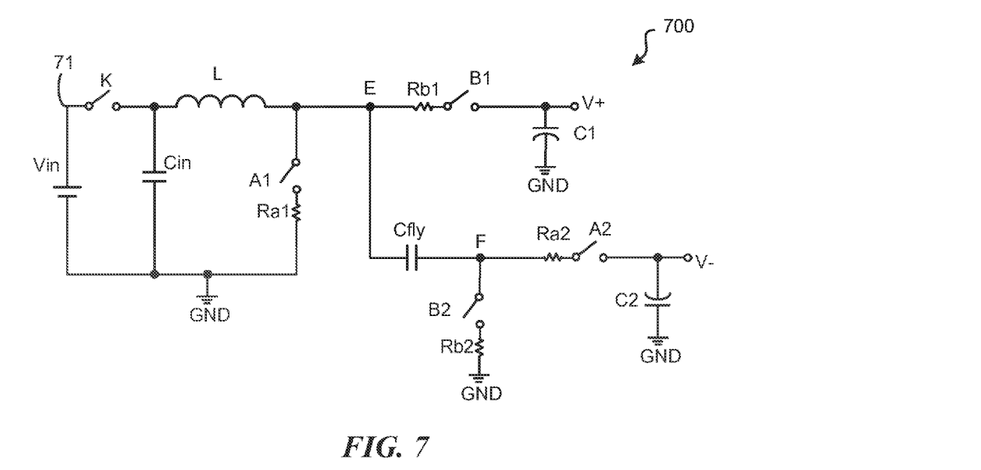
FIG. 7 shows a circuit diagram of a boost charge pump 700 having a switch K coupled to the input terminal 71 according to an embodiment of the present invention.

FIG. 7 shows a boost charge pump 700 having a switch K coupled to an input terminal 71 according to an embodiment of the present invention. The topology of boost charge pump 700 is similar to the charge pump 300 in FIG. 3. For ease of illustration, the connection relationship of charge pump 700 will not be described in detail. Boost charge pump 700 further comprises switch K coupled between the input terminal 71 and the inductor L. In order to have a good tracking performance between the negative output voltage V− and the positive output voltage V+ at startup, switch K is initially turned OFF and the inductor L is disconnected from the input terminal 71, when the switches A1, B1, A2 and B2 are in OFF state, for example, when an UVLO signal is in active state. In one embodiment, switch K has a control end coupled to and controlled by the UVLO signal. And when UVLO signal shifts into inactive state, switch K is turned ON to connect inductor L to the input terminal 71, and at the meantime, the switches A1, A2, B1 and B2 start switching. Accordingly, the first output capacitor C1 and the flying capacitor Cfly start to be charged at the same time, and the negative output voltage V− tracks the positive output voltage V+ well.

Figure 8:
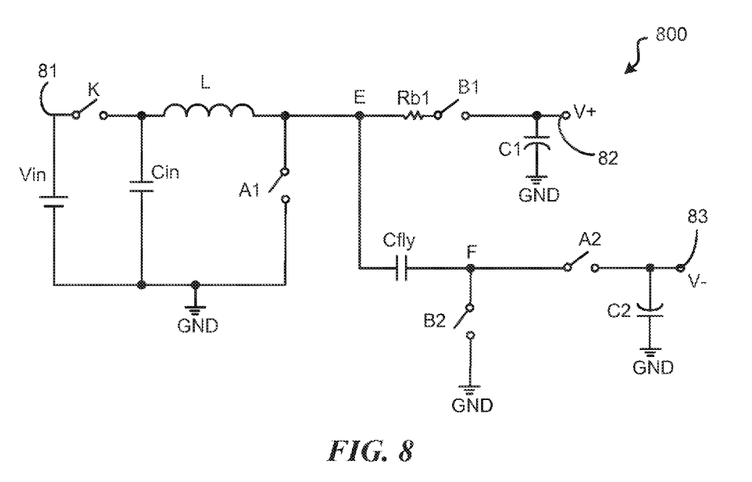
FIG. 8 shows a circuit diagram of a boost charge pump 800 wherein a switch B1 is coupled in series with a discrete resistor Rb1 according to an embodiment of the present invention.

FIG. 8 shows a boost charge pump 800 wherein switch B1 is coupled in series with a resistor Rb1 according to an embodiment of the present invention. Boost charge pump 800 comprises an input terminal 81 coupled to an input voltage Vin, a positive output terminal 82 configured to provide a positive output voltage V+, a negative output terminal 83 configured to provide a negative output voltage V−, an inductor L, a first switch A1, the second switch B1, a third switch A2, a fourth switch B2, a flying capacitor Cfly, a first output capacitor C1, a second output capacitor C2 and the resistor Rb1. The topology of boost charge pump 800 is similar to boost charge pump 300 in FIG. 3. Except that only one additional resistor Rb1 is coupled in series with the second switch B1. It should be known that the other switches A1, A2 and B2 may have parasitic on-resistances. However, resistor Rb1 for switch B1 is manufactured particularly to have a larger serially coupled resistance for the second switch B1 than those for the other switches A1, A2 and B2. In one embodiment, the particularly manufactured resistor Rb1 is an integrated resistor with particular layout size or doping concentration manufactured in the same semiconductor substrate with the second switch B1. In another embodiment, the particularly manufactured resistor Rb1 is a discrete resistor. Accordingly, the serially coupled resistance for the second switch B1 is larger than resistances for the other switches and these asymmetric resistances will lead to good tracking between the negative output voltage V− and the positive output voltage V+.

In the shown embodiment in FIG. 8, a switch K is coupled between the input terminal 81 and the first end of the inductor L, wherein the switch K is initially turned OFF when the switches A1, A2, B1 and B2 are in OFF state, and then turned ON when the switches A1, A2, B1 and B2 start switching, to make sure that the first output capacitor C1 and the flying capacitor Cfly start to be charged at the same time and have a good tracking performance at startup. As can be appreciated, the boost charge pump in FIG. 8 can be executed without switch K. And in one embodiment, in order to have a good tracking performance at startup, an UVLO signal is coupled to the second switch B1 and the fourth switch B2 to block the body diode of the second switch B1 and the body diode of the fourth switch B2 as described in the foregoing description.

Figure 9A:
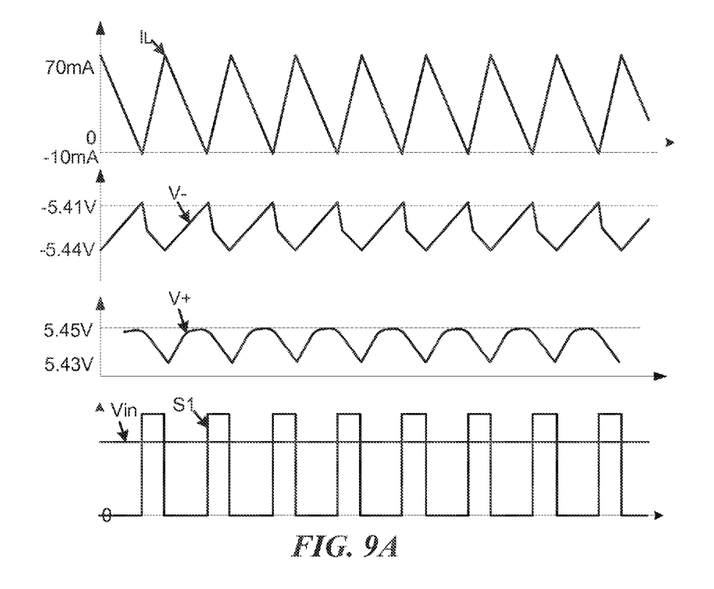
FIG. 9A shows waveforms of the boost charge pump shown in FIG. 3 during steady state and FIG. 9B shows waveforms of the boost charge pump at startup, according to an embodiment of the present invention.
Figure 9B:
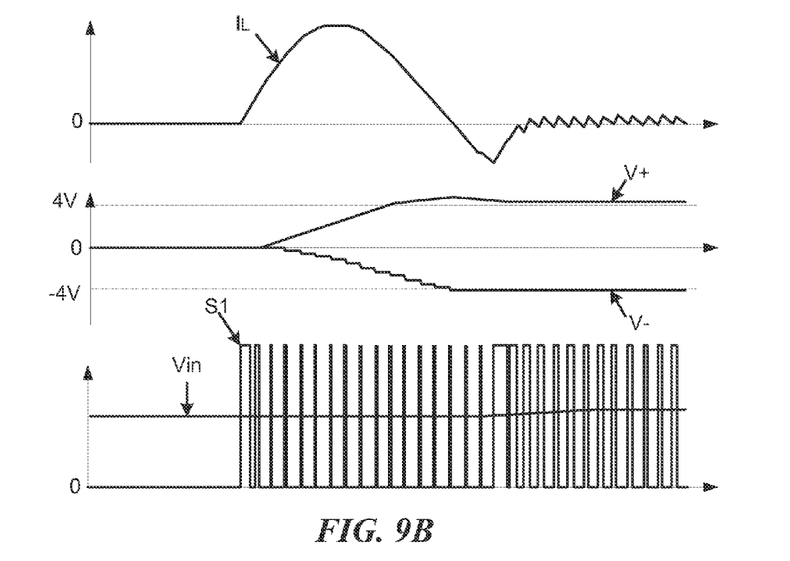

FIG. 9A illustrates simulation waveforms of the boost charge pump 300 in FIG. 3 at steady state, and FIG. 9B illustrates waveforms of the boost charge pump 300 at startup, according to an embodiment of the present invention. And In this embodiment, the input voltage Vin=3.6 Volts, Io+=Io−=10 mA, Rb1=3 Ohms, Ra1=0.45 Ohms, and Rb2=Ra2=0.5 Ohms. It can be seen in the simulation diagram FIG. 9A that during steady state, the negative output voltage V− is between −5.41 Volts to −5.44 Volts, and the positive output voltage V+ is between 5.43 Volts to 5.45 Volts. The difference percentage between voltages V− and V+ is less than 0.3%, thus the negative output voltage tracks the positive output voltage well. In detail, when the driving signal S1 on the gates of the first switch A1 and the third switch A2 is high, the switches A1 and A2 are turned ON and the switches B1 and B2 are turned OFF. Accordingly, the second output capacitor C2 is discharged and the absolute value of the negative output voltage V− increases. At the meantime, the inductor current IL increases, the first output capacitor C1 is discharged by the load and the positive output voltage V+ decreases. When the driving signal S1 turns LOW, the switches B1 and B2 are turned ON, and the switches A1 and A2 are turned OFF. Accordingly, the first output capacitor C1 is charged, and the positive output voltage V+ increases. At the meantime, the inductor current IL decreases and the absolute value of the negative output voltage V− decreases.

When at startup referring to FIG. 9B, it can also be seen that the negative output voltage V− and the positive output voltage V+ start to rise from zero substantially at the same time, and the negative output voltage V− tracks the positive output voltage V+ well where there is little difference between the absolute value of negative output voltage V− and the positive output voltage V+.

In one embodiment, the loads at the positive output terminal and the negative output terminal are unbalanced, where the input voltage Vin=4.2 Volts, the current at positive output terminal Io+=20 mA, the current at negative output terminal Io−=14 mA, the resistors Rb1=3 Ohms, Ra1=0.45 Ohms, and Rb2=Ra2=0.5 Ohms. The simulated difference percentage between negative output voltage and positive output voltage is less than 1%. And thus the load unbalance is compensated well.

Figure 10:
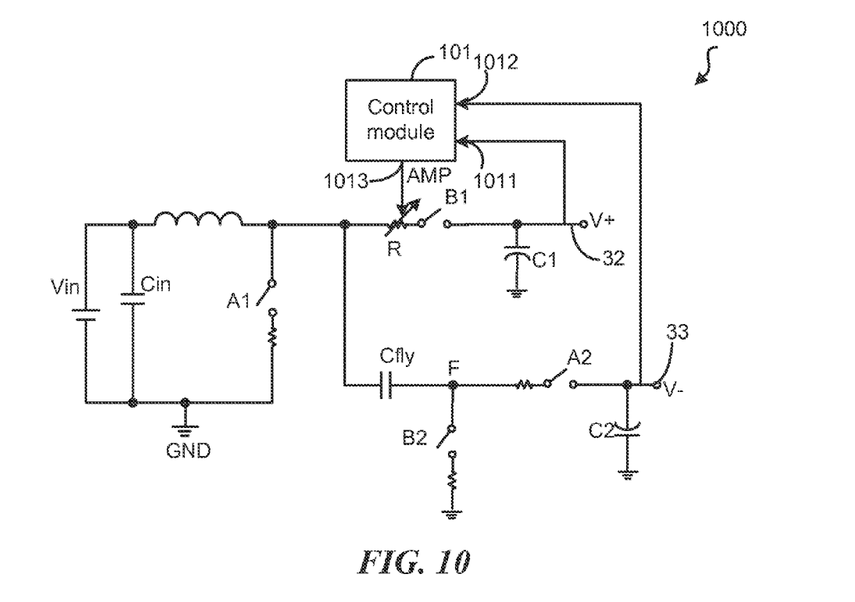
FIG. 10 shows a schematic diagram of a charge pump 1000 with resistance R adjusted by a feedback loop according to an embodiment of the present invention.

FIG. 10 shows a boost charge pump 1000 with a serially coupled resistance R adjusted with a feedback loop when the corresponding switch is turned ON according to an embodiment of the present invention. For simplicity, the features which are the same with the boost charge pump 300 in FIG. 3 will not be described in detail. During the ON state of the second switch B1 and the fourth switch B2, the resistance R serially coupled with the second switch B1 is adjusted based on the negative output voltage V− and the positive output voltage V+ to make sure that the negative output voltage V− tracks the positive output voltage V+. In the embodiment shown in FIG. 10, charge pump 1000 comprises a resistance control module 101 to form a feedback loop. Resistance control module 101 comprises a first input 1011 coupled to the positive output terminal 32 to receive the positive output voltage V+, a second input 1012 coupled to the negative output terminal 33 to receive the negative output voltage V− and an output 1013 configured to adjust the resistance R serially coupled with the second switch B1 Thus resistance R is controlled based on the voltage difference between the absolute value of the negative output voltage V− and the positive output voltage V+. In the shown embodiment, when the absolute value of the negative output voltage V− is less than the positive output voltage V+, the resistance R is adjusted to be higher to increase the absolute value of negative output voltage V−. And when the absolute value of the negative output voltage V− surpasses the positive output voltage V+, the resistance R is adjusted to be lower to decrease the absolute value of negative output voltage V−. In one embodiment, when the second switch B1 is turned ON, signal AMP at output 1013 of resistance control module 101 controls the gate of switch B1, and when the second switch B1 is required to be turned OFF, the gate of switch B1 is overtaken by a logic LOW voltage, e.g. a ground voltage. As can be appreciated, the boost charge pump may have other topologies and one serially coupled resistance of a switch is controlled according to the negative output voltage and positive output voltage. In one embodiment, the adjustable serially coupled resistance is from an adjustable discrete resistor, referring to resistor Rb1 in FIG. 8. In another embodiment, the adjustable serially coupled resistance is an on-resistance of the corresponding switch, and the resistance is adjusted by controlling the gate voltage of the switch.

Figure 11:
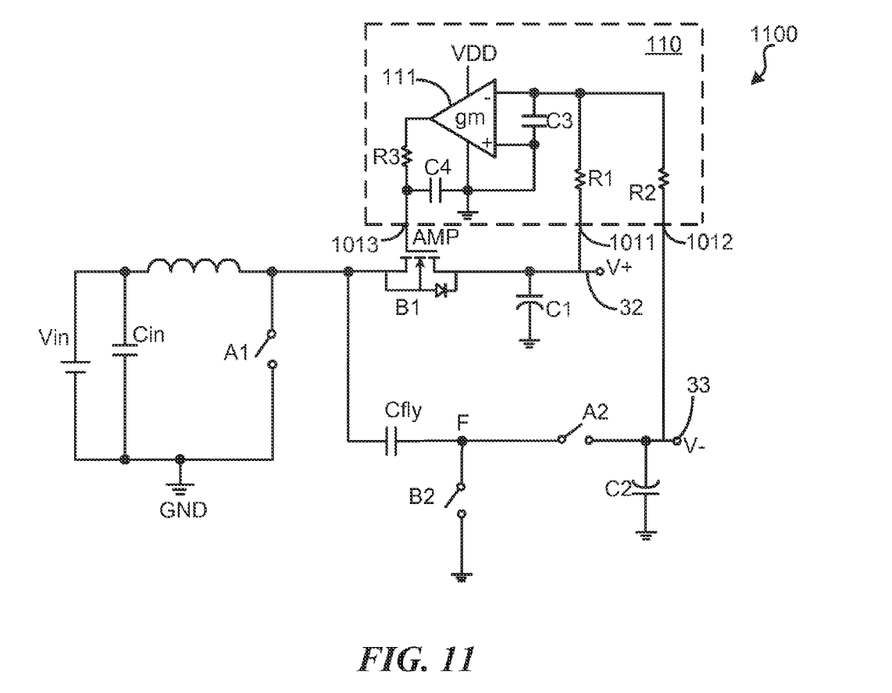
FIG. 11 shows a circuit diagram of a boost charge pump 1100 where the serially coupled resistance of a switch B1 is adjusted by controlling a gate voltage of the switch, according to an embodiment of the present invention.

FIG. 11 shows a charge pump 1100 where the serially coupled resistance of a switch is adjusted by controlling a gate voltage of the switch, according to an embodiment of the present invention. For simplicity, the features which are the same with the boost charge pump 300 in FIG. 3 will not be described in detail. The second switch B1 of charge pump 1100 comprises a transistor and has on-resistance. Compared to boost charge pump 300 in FIG. 3, boost Charge pump 1100 further comprises a resistance control module 110. Resistance control module 110 comprises a first input 1011 receiving the positive output voltage V+, a second input 1012 receiving the negative output voltage V− and an output 1013 coupled to the control end e.g. gate of the second switch B1. In the shown embodiment, resistance control module 110 comprises a first resistor R1, a second resistor R2 and a trans-conductance amplifier 111 (gm). The first resistor R1 has one terminal coupled to the positive output terminal 32 to receive the positive output voltage V+, and another terminal coupled to an inverting input of trans-conductance amplifier 111. The second resistor R2 has one terminal coupled to the negative output terminal 33 to receive the negative output voltage V− and has another terminal coupled to the inverting input of trans-conductance amplifier 111. Trans-conductance amplifier 111 is configured to receive the voltage difference between the absolute value of negative output voltage V− and the positive output voltage V+, and to provide an amplifying signal AMP supplied to the gate of transistor B1. When the absolute value of negative output voltage V− is less than the positive output voltage V+, the output signal AMP is adjusted to improve the on-resistance of transistor B1. In the shown embodiment, the transistor B1 comprises an N-type MOSFET, and the control signal AMP is decreased to improve the on-resistance of transistor B1, In another embodiment, the control signal AMP is increased to improve the on-resistance of switch B1. And when the absolute value of negative output voltage V− is higher than the positive output voltage V+, the output signal AMP is adjusted to decrease the on-resistance of transistor B1, Trans-conductance amplifier 111 further has a non-inverting input coupled to reference ground CND, and has an output coupled to the gate of transistor B1 to provide the amplifying signal AMP. The resistors R1 and R2 are selected to have the same or substantially same resistance. When the absolute value of negative output voltage V− is less than the positive output voltage V+, the voltage at the inverting input of trans-conductance amplifier 111 is higher than ground voltage. Thus signal AMP is decreased to increase the on-resistance of transistor B1, and accordingly, the absolute value of the negative output voltage V− increases. And when the absolute value of negative output voltage V− is higher than the positive output voltage V+, the voltage at the inverting input of trans-conductance amplifier 111 is a negative value and is lower than ground voltage. Thus signal AMP is increased to decrease the on-resistance of transistor B1, and accordingly, the absolute value of the negative output voltage V− decreases. In the shown embodiment, resistance control module 110 further comprises capacitors C3 and C4, and resistor R3, configured to transfer the current signal output by the trans-conductance amplifier into voltage signal. However, in other embodiments, capacitors and resistor may be eliminated or coupled in other configuration.

In another embodiment, resistors R1 and R2 may be coupled to the non-inverting input of the trans-conductance amplifier 111 and the reference ground is coupled to the inverting input of the trans-conductance amplifier 111. In yet another embodiment, trans-conductance amplifier 111 has a first input configured to receive the positive output voltage V+ and a second input configured to receive the negative output voltage V−, to amplify the voltage difference between the absolute value of negative output voltage V− and positive output voltage V+. And in some embodiments, the second switch B1 may comprise P-type MOSFET, JFET or any other type of transistors. As can be appreciated, resistance control module may have various alternatives as long as the on-resistance of transistor B1 increases when the positive output voltage increases compared to the absolute value of the negative output voltage.

While various embodiments have been described above, it should be understood that they have been presented by way of example only, and not limitation. Thus, the breadth and scope of a prefV1ed embodiment should not be limited by any of the above-described exemplary embodiments, but should be defined only in accordance with the following claims and their equivalents.

We claim:

1. A method of having a negative output voltage at a negative output terminal of a charge pump tracking a positive output voltage at a positive output terminal of the charge pump, wherein the charge pump comprises a first switch, a second switch, a third switch, a fourth switch, an inductor, a first output capacitor, a flying capacitor and a second output capacitor, wherein:
   the inductor having a first end and a second end, wherein the first end is coupled to an input terminal;
   the first switch having a first end, a second end and a control end, wherein the first end of the first switch is coupled to the second end of the inductor, and the second end of the first switch is coupled to a reference ground;
   the second switch having a first end, a second end and a control end, wherein the first end of the second switch is coupled to the second end of the inductor, and the second end of the second switch is coupled to the positive output terminal;
   the first output capacitor having a first end and a second end, wherein the first end of the first output capacitor is coupled to the second end of the second switch, and the second end of the first output capacitor is coupled to the reference ground;
   the flying capacitor having a first end and a second end, wherein the first end of the flying capacitor is coupled to the second end of the inductor;
   the third switch having a first end, a second end and a control end, wherein the first end of the third switch is coupled to the second end of the flying capacitor and the second end of the third switch is coupled to the negative output terminal;
   the second output capacitor having a first end and a second end, wherein the first end of the second output capacitor is coupled to the second end of the third switch, and the second end of the second output capacitor is coupled to the reference ground; and
   the fourth switch having a first end, a second end and a control end, wherein the first end of the fourth switch is coupled to the second end of the flying capacitor and the second end of the fourth switch is coupled to the reference ground;
   the method comprising selecting a serial resistance for the second switch in its ON state to be at least twice higher than the serial resistance for each of the first switch, the third switch and the fourth switch in their ON states.

2. The method of claim 1, wherein selecting the serial resistance for the second switch comprises selecting a doping concentration or layout for the second switch different from those for the first switch, the third switch and the fourth switch, and wherein the first switch, the second switch, the third switch and the fourth switch are manufactured on a same semiconductor substrate.

3. The method of claim 1, wherein the charge pump comprises a boost charge pump.

4. The method of claim 1,
   further comprising:
      during a first time period of a cycle period, turning ON the second switch and the fourth switch, and turning OFF the first switch and the third switch; and
      during a second time period of the cycle period, turning OFF the second switch and the fourth switch, and turning ON the first switch and the third switch.

5. The method of claim 1, further comprising starting charging the first output capacitor and the flying capacitor at the same time at startup.

6. The method of claim 1, wherein the method of selecting the serial resistance for the second switch at least twice higher than the serial resistance for each of the first switch, the third switch and the fourth switch comprises: coupling a discrete resistor to the second switch in series.

7. The method of claim 4, further comprising:
   blocking a body diode of the second switch and a body diode of the fourth switch during startup when the first switch, the second switch, the third switch and the fourth switch are in OFF state; and
   releasing the body diode of the second switch and the body diode of the fourth switch at the same time for normal operation.

8. The method of claim 4, comprising:
   coupling an under voltage lockout (UVLO) signal to the second switch and the fourth switch; and
   blocking a body diode of the second switch and a body diode of the fourth switch when the UVLO signal is in an active state.

9. The method of claim 4, further comprising adjusting an on-resistance of the second switch by controlling a voltage on the control end of the second switch, wherein the on-resistance of the second switch is adjusted based on the negative output voltage and the positive output voltage.

10. The method of claim 4, further comprising coupling a switch between the input terminal and the inductor, and wherein the switch is turned OFF when the input voltage is below a threshold voltage.

11. A charge pump, having an input terminal configured to receive an input voltage, a positive output terminal configured to provide a positive output voltage and a negative output terminal configured to provide a negative output voltage, the charge pump comprising a first switch, a second switch, a third switch, a fourth switch, an inductor, a first output capacitor, a flying capacitor and a second output capacitor, wherein:
the inductor having a first end and a second end, wherein the first end is coupled to an input terminal;
the first switch having a first end, a second end and a control end, wherein the first end of the first switch is coupled to the second end of the inductor, and the second end of the first switch is coupled to a reference ground;
the second switch having a first end, a second end and a control end, wherein the first end of the first switch is coupled to the second end of the inductor, and the second end of the second switch is coupled to the positive output terminal;
the first output capacitor having a first end and a second end, wherein the first end of the first output capacitor is coupled to the second end of the second switch, and the second end of the first output capacitor is coupled to the reference ground;
the flying capacitor having a first end and a second end, wherein the first end of the flying capacitor is coupled to the second end of the inductor;
the third switch having a first end, a second end and a control end, wherein the first end of the third switch is coupled to the second end of the flying capacitor and the second end of the third switch is coupled to the negative output terminal;
the second output capacitor having a first end and a second end, wherein the first end of the second output capacitor is coupled to the second end of the third switch, and the second end of the second output capacitor is coupled to the reference ground; and
the fourth switch having a first end, a second end and a control end, wherein the first end of the fourth switch is coupled to the second end of the flying capacitor and the second end of the fourth switch is coupled to the reference ground; wherein
the serial resistance for the second switch in its ON state is at least twice higher than each serial resistance for the first switch, the third switch and the fourth switch in their ON states.

12. The charge pump of claim 11, wherein a transistor for the second switch has a doping concentration or layout different from those for the first switch, the third switch and the fourth switch, and wherein the first switch, the second switch, the third switch and the fourth switch are manufactured on a same semiconductor substrate.

13. The charge pump of claim 11, wherein
during a first time period of a cycle period, the second switch and the fourth switch are configured to be turned ON, and the first switch and the third switch are configured to be turned OFF;
during a second time period of the cycle period, the second switch and the fourth switch are configured to be turned OFF, and the first switch and the third switch are configured to be turned ON.

14. The charge pump of claim 13, wherein an UVLO signal is coupled to the second switch and the fourth switch, such that a body diode of the second switch and a body diode of the fourth switch are configured to be blocked when the UVLO signal is in an active state.

15. The charge pump of claim 13, further comprising a trans-conductance amplifier, wherein the trans-conductance amplifier is configured to receive the voltage difference between the absolute value of the negative output voltage and the positive output voltage, and wherein the trans-conductance amplifier is configured to output an amplifying signal coupled to the control end of the second switch.

16. The charge pump of claim 15, further comprising:
a first resistor, having a first terminal coupled to the positive output terminal and a second terminal coupled to a first input of the trans-conductance amplifier; and
a second resistor, having a first terminal coupled to the negative output terminal and a second terminal coupled to the first input of the trans-conductance amplifier;
wherein a second input of the trans-conductance amplifier is coupled to a reference ground.

17. The charge pump of claim 13, further comprising a switch coupled between the input terminal and the first end of the inductor, wherein the switch is configured to be turned OFF when the input voltage is below a threshold voltage.

18. The charge pump of claim 11 further comprising a resistance control module, the resistance control module having:
a first input coupled to the positive output terminal;
a second input coupled to the negative output terminal; and
an output coupled to a corresponding switch configured to adjust the resistance of the corresponding switch based on the negative output voltage and the positive output voltage.

19. A boost charge pump, having an input terminal coupled to an input voltage, a positive output terminal configured to provide a positive output voltage, and a negative output terminal configured to provide a negative output voltage, the boost charge pump comprising:
an inductor, having a first end and a second end, wherein the first end of the inductor is coupled to the input terminal;
a first switch, having a first end, a second end and a control end, wherein the first end of the first switch is coupled to the second end of the inductor, and the second end of the first switch is coupled to a reference ground;
a second switch, having a first end, a second end and a control end, wherein the first end of the second switch is coupled to the second end of the inductor, and the second end of the second switch is coupled to the positive output terminal;
a first output capacitor, having a first end and a second end, wherein the first end of the first output capacitor is coupled to the second end of the second switch, and the second end of the first output capacitor is coupled to the reference ground;
a flying capacitor, having a first end and a second end, wherein the first end of the flying capacitor is coupled to the second end of the inductor;
a third switch, having a first end, a second end and a control end, wherein the first end of the third switch is coupled to the second end of the flying capacitor and the second end of the third switch is coupled to the negative output terminal;
a second output capacitor, having a first end and a second end, wherein the first end of the second output capacitor is coupled to the second end of the third switch, and the second end of the second output capacitor is coupled to the reference ground;
a fourth switch, having a first end, a second end and a control end, wherein the first end of the fourth switch is coupled to the second end of the flying capacitor and the second end of the fourth switch is coupled to the reference ground; and a discrete resistor, coupled in series with the second switch such that the negative output voltage tracks the positive output voltage;

wherein during a first time period of a cycle period, the second switch and the fourth switch are configured to be turned ON, and the first switch and the third switch are configured to be turned OFF; and during a second time period of the cycle period, the second switch and the fourth switch are configured to be turned OFF, and the first switch and the third switch are configured to be turned ON.

* * * * *